(12) United States Patent
Singh et al.

(10) Patent No.: US 11,002,177 B2
(45) Date of Patent: May 11, 2021

(54) SYSTEM AND METHOD FOR STAGED PRE-CHAMBER PURGING

(71) Applicant: Caterpillar Inc., Deerfield, IL (US)

(72) Inventors: Jaswinder Singh, Dunlap, IL (US); Martin L. Willi, Dunlap, IL (US); Patrick J. Seiler, Peoria, IL (US); Michael Bardell, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 154 days.

(21) Appl. No.: 16/191,803

(22) Filed: Nov. 15, 2018

(65) Prior Publication Data
US 2020/0158005 A1 May 21, 2020

(51) Int. Cl.
F02B 19/12 (2006.01)
F02B 19/04 (2006.01)
F02B 19/10 (2006.01)
F02D 41/00 (2006.01)
F02D 13/02 (2006.01)
F02M 25/08 (2006.01)
F02M 26/20 (2016.01)

(52) U.S. Cl.
CPC .............. *F02B 19/12* (2013.01); *F02B 19/04* (2013.01); *F02B 19/1061* (2013.01); *F02D 13/0276* (2013.01); *F02D 41/003* (2013.01); *F02M 25/08* (2013.01); *F02M 26/20* (2016.02)

(58) Field of Classification Search
CPC ...... F02B 19/12; F02B 19/04; F02B 19/1061; F02D 41/003; F02D 13/0276; F02D 41/0002; F02D 41/0007; F02D 41/0027; F02M 25/08; F02M 26/20; F02M 26/08; Y02T 10/12; Y02T 10/40
See application file for complete search history.

(56) References Cited

U.S. PATENT DOCUMENTS

| 4,271,810 A | 6/1981 | Lancaster |
| 9,225,151 B2 | 12/2015 | Douglas et al. |
| 9,249,746 B2 | 2/2016 | Geckler et al. |
| 9,995,202 B2 | 6/2018 | Willi et al. |
| 2013/0005985 A1 | 3/2013 | Gruber et al. |
| 2015/0354481 A1* | 12/2015 | Geckler ............... F02D 41/0057 60/278 |
| 2018/0038269 A1* | 2/2018 | Willi .................... F02B 19/18 |
| 2018/0135541 A1* | 5/2018 | Hsieh .................. F02D 41/18 |
| 2018/0363539 A1* | 12/2018 | Shelby ................. F02B 19/108 |

FOREIGN PATENT DOCUMENTS

JP 2004-204835 A 7/2004

* cited by examiner

Primary Examiner — Joseph J Dallo
Assistant Examiner — Scott A Reinbold
(74) Attorney, Agent, or Firm — Leydig, Voit & Mayer, Ltd.

(57) ABSTRACT

An internal combustion engine includes low and high pressure turbochargers connected in series. An engine cylinder has an intake valve that fluidly connects a main chamber of the engine cylinder with an outlet of the high pressure compressor through an intake passage. An exhaust gas recirculation passage is fluidly interconnected between exhaust and intake conduits. A pre-chamber encloses a spark plug and is fluidly open with the main chamber of the engine cylinder. A first fluid path extends from the intake passage directly to the pre-chamber, and a second fluid path extends from the intermediate passage directly to the pre-chamber.

13 Claims, 5 Drawing Sheets

SYSTEM AND METHOD FOR STAGED PRE-CHAMBER PURGING

TECHNICAL FIELD

This patent disclosure relates generally to an internal combustion engine and, more particularly, to an internal combustion engine having a sparkplug assembly with a pre-chamber volume for igniting combustion in the main combustion chamber of the engine.

BACKGROUND

Internal combustion engines combust fuel to convert the potential chemical energy therein to mechanical power that can be utilized for various applications. A common configuration of an internal combustion engine includes a combustion chamber formed as a cylinder with a reciprocal piston slideably disposed therein. Air is drawn into the cylinder by the downward motion of the piston with respect to the lengthwise dimension of the cylinder. Fuel is introduced to the cylinder either by direct injection, port fuel injection (PFI), or by being premixed with air that is drawn in. The piston reciprocally moves toward the top of the cylinder in a compression stroke compressing the air therein. The compressed air and introduced fuel are combusted forcing the piston again to move downwards in a power or expansion stroke. The engine can harness the forced motion of the piston for other work, such as propelling a vehicle, operating an implement, or running a pump or generator.

A variety of fuels can be combusted, including hydrocarbon-based fuels such as the traditional gasoline or diesel or alternatively liquid natural gas (LNG) or compressed natural gas (CNG). Ignition of the fuel in the combustion chamber may be induced by a sparkplug or glowplug, although in other embodiments the fuel may be susceptible to auto-ignition due to compression from the upward motion of the piston. In some embodiments, a pre-combustion chamber or pre-chamber may be located proximate to and in fluid communication with the main combustion chamber that serves as an additional volume in which a mixture of fuel and air is initially ignited to induce combustion that then propagates into the main combustion chamber.

The makeup of material within the pre-chamber can sometimes vary from the makeup of material that is present within the combustion chamber due to insufficient mixing of material between the pre-chamber and the main chamber prior to ignition. In some instances, exhaust gas may remain in the pre-chamber from a previous expansion stroke. Such exhaust gas may not be sufficiently vented when a new intake charge enters the main chamber during an intake stroke, which can lead to an inefficient ignition. It has been proposed in the past to purge the pre-chamber by introducing a clean air/fuel mixture into the pre-chamber. One example of a previously proposed purging system can be seen in U.S. Pat. No. 9,249,746 ("Geckler"), which issued on Feb. 2, 2016. Geckler describes a system and method in which purge gas is introduced into a pre-chamber. The purge gas is a gas containing oxygen such that a pre-chamber charge can be created. While Geckler's systems and methods are an improvement over engines having pre-chambers that are not purged, there is always room for further improvements in engine operation and combustion efficiency.

SUMMARY

The disclosure describes, in one aspect, an internal combustion engine. The internal combustion engine includes a low pressure (LP) turbocharger having a LP compressor, a high pressure (HP) turbocharger having a HP compressor connected in series with the LP compressor along an intermediate passage, and a HP turbine. An engine cylinder has an intake valve that fluidly connects a main chamber of the engine cylinder with an outlet of the HP compressor through an intake passage, and an exhaust valve that fluidly connects the main chamber with an inlet of the HP turbine via an exhaust conduit. An exhaust gas recirculation (EGR) passage is fluidly interconnected between the exhaust conduit and the intake passage. A pre-chamber encloses a spark plug and is fluidly open with the main chamber of the engine cylinder. A first fluid path extends from the intake passage directly to the pre-chamber, and a second fluid path extends from the intermediate passage directly to the pre-chamber.

In another aspect, the disclosure describes a method for operating an internal combustion engine. The method includes providing a low pressure (LP) turbocharger having a LP compressor, providing a high pressure (HP) turbocharger having a HP compressor connected in series with the LP compressor along an intermediate passage, and a HP turbine, and providing an engine cylinder having an intake valve that fluidly connects a main chamber of the engine cylinder with an outlet of the HP compressor through an intake passage, and an exhaust valve that fluidly connects the main chamber with an inlet of the HP turbine via an exhaust conduit. The method further includes providing an exhaust gas recirculation (EGR) passage fluidly interconnected between the exhaust conduit and the intake passage, and providing a pre-chamber enclosing a spark plug and being fluidly open with the main chamber of the engine cylinder. A first fluid path is defined extending from the intake passage directly to the pre-chamber, and a second fluid path is defined extending from the intermediate passage directly to the pre-chamber. Gases to purge the pre-chamber at least during an intake stroke of the engine cylinder are selectively provided, wherein the gases are provided through the first fluid path during a first purge stage and through the second fluid path during a second purge stage.

In yet another aspect, the disclosure describes a method for purging a pre-chamber that contains a spark plug and is associated with a main combustion chamber of a reciprocal piston internal combustion engine. The method includes opening an intake valve at a beginning of an intake stroke for an engine cylinder, providing an intake charge directly into the pre-chamber and the main combustion chamber along parallel but separate flow paths in a first purge stage, the intake charge containing fuel, air and recirculated exhaust gas, closing the intake valve while continuing the intake stroke, and providing a rich charge directly into the pre-chamber from an intermediate compressor stage in a second purge stage, the rich charge containing fuel and air but not recirculated exhaust gas. The intake charge is provided to the pre-chamber along a first fluid path, and the rich charge is provided to the pre-chamber along a second fluid path. The main combustion chamber and pre-chamber are compressed during a compression stroke, the rich charge is ignited in the pre-chamber, and the intake charge is ignited in the main combustion chamber.

DETAILED DESCRIPTION

Engines include various components and systems that control and carry out various functions to operate the engine. Relevant to the present disclosure, certain engine components and systems are shown in a simplified schematic form to facilitate the discussion that follows, but it should be appreciated that the disclosed systems and methods are applicable to any known type of internal combustion engine that includes one or more reciprocating pistons. More particularly, the present disclosure is directed to internal combustion engines that operate using one or more fuels including a gaseous fuel. A cylinder charge, which can include a predefined amount of fuel and air to form an air/fuel mixture at a controlled air/fuel ratio, and which can also include a predefined amount of exhaust gas recirculation (EGR) gas, may be compressed within a cylinder volume and ignited to produce power. The air/fuel ratio (AFR) may be selected and controlled depending on engine operating parameters and operating points. In the illustrated embodiments, the AFR is selected to be close to a stoichiometric value, but it should be appreciated that other AFRs may also be used.

Figure 1:
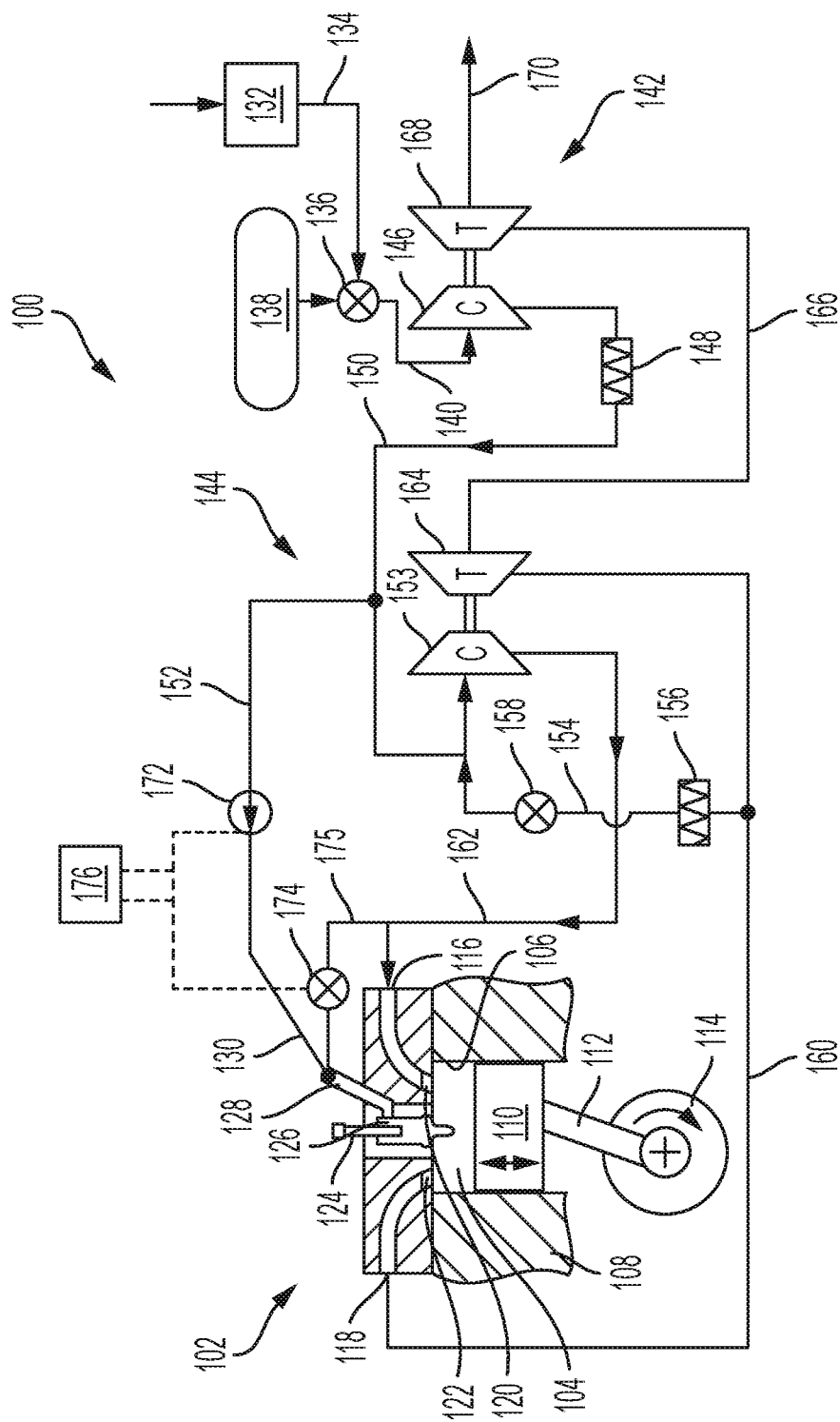
FIG. 1 is a schematic diagram of a portion of an internal combustion engine in accordance with the disclosure.

One embodiment of a portion of an engine 100 is shown schematically in FIG. 1. Relevant to the present disclosure, the engine 100 includes at least an engine cylinder 102 that has a variable volume 104 formed between a bore 106 formed in a cylinder case 108 and a piston 110, which reciprocates within the bore 106 in the known fashion. The variable volume 104 forms a main combustion chamber for the engine cylinder 102. The piston 110 is connected via a connecting rod 112 to a crankshaft 114, which delivers engine power. The variable volume or main chamber 104 includes intake and exhaust valves, which operate in the traditional fashion to selectively fluidly connect the variable volume 104 with one or more intake ports 116 and one or more exhaust ports 118. During operation, an intake charge is provided to the variable volume 104 through the intake port 116 when one or more intake valve(s) 120 is/are open and, similarly, exhaust gases and other byproducts of combustion are evacuated from the variable volume 104 through the exhaust port 118 when one or more exhaust valve(s) 122 is/are open.

To initiate combustion within the variable volume 104, a spark plug 124 is disposed in fluid communication with the variable volume 104. In the embodiment illustrated, the spark plug 124 is disposed within a pre-chamber 126, which is a cavity that is generally enclosed and includes one or more openings that communicate directly with the variable volume 104. During operation, a pre-chamber charge containing fuel, air and other materials present in the pre-chamber 126 is ignited by a spark provided by the spark plug 124 to create a flame. The flame propagates through the pre-chamber 126 and exits through the pre-chamber openings into the main chamber or variable volume 104 to ignite a fuel/air mixture found therein, which may also contain other fluids such as EGR gas. In traditional engines, the pre-chamber 126 may receive its pre-chamber charge from the variable volume 104, for example, during an intake or compression stroke. In the illustrated embodiment, the pre-chamber 126 further includes a capillary passage 128, which fluidly interconnects an interior volume of the pre-chamber 126 with a pre-chamber port 130.

During engine operation, air enters the engine through an air inlet 132, which can include an air cleaner or filter. Air from the inlet 132 passes through an intake air passage 134 to a mixer 136, which mixes air from the inlet 132 with a gaseous fuel provided by a gaseous fuel source 138. The gaseous fuel source 138 is shown simplified, and can include various components and systems that provide a gaseous fuel at a desired flow rate, temperature and pressure. For example, the gaseous fuel source 138 can include a liquefied petroleum gas (LPG) or a liquefied natural gas (LNG) cryogenic storage tank, heat exchangers to bring the gas to a useable temperature, pumps, filters and the like to condition the gas, and/or other components. The gaseous fuel in mixture with air is provided to an engine inlet passage 140.

In the illustrated embodiment, the engine 100 includes two or dual-staged turbochargers, which include a low pressure (LP) turbocharger 142 connected in series with a high pressure (HP) turbocharger 144. A mixture of fuel and air, for example, natural gas and air, from the mixer 136 is provided to the inlet of a LP compressor 146, where it is pressurized in the known fashion, for example, to an intermediate pressure of about 2.5-3 bar. The mixture at the intermediate pressure is provided through an inter-stage cooler 148 to an intermediate passage 150. The intermediate passage 150, therefore, carries a fuel/air mixture at an intermediate pressure. At least a portion of the fuel/air mixture in the intermediate passage 150 is provided to an inlet of a HP compressor 153, where its pressure is increased to a boost pressure, for example, of about 4.5-5 bar. The pressurized fuel/air mixture is provided to the intermediate passage 150.

In the illustrated embodiment, an EGR passage 154 that can include an EGR cooler 156 and an EGR valve 158 connects an exhaust conduit 160 with the inlet of the HP compressor 153 and/or the intermediate passage 150. Gas operating pressures in these various passages during engine operation urge exhaust gas from the exhaust conduit 160 to pass through the EGR cooler 156 and the EGR valve 158 into the inlet of the HP compressor 153. While in the HP compressor 153, the fuel/air mixture from the intermediate passage 150 mixes with exhaust gas from the EGR passage 154 to form a cylinder charge that is provided to a charge passage 162 that is provided to the one or more intake port(s) 116 (one shown).

In the staged HP/LP turbocharger configuration shown in FIG. 1, exhaust gas follows a similar path as intake air through the HP and then the LP stages. More specifically, exhaust gas in the exhaust conduit 160 is provided from the one or more exhaust port(s) 118. At least a portion of the exhaust gas in the exhaust conduit 160 passes to the EGR passage 154, and a remaining portion passes into, and drives, the HP turbine 164, an intermediate conduit 166, and the LP turbine 168 before being provided to an exhaust stack 170, which may also include other components for treating the exhaust gas (not shown) before expelling it to the environment.

In the embodiment of the engine 100 shown in FIG. 1, gases are supplied through the capillary passage 128 to purge the pre-chamber 126 before each expansion stroke of the main chamber 104. Unlike previously proposed solutions, the purging of the pre-chamber 126 may occur in stages such that exhaust gas that may remain in or occupy the pre-chamber following an expansion stroke is removed or diluted with an additional concentration of oxygen, which is provided to and is made available in the pre-chamber 126 as compared to a charge in the main chamber or main chamber 104 for ignition. More specifically, the capillary passage 128 is fluidly connectable to the intermediate passage 150 via a pump or valve, which, when open or operated, provides a mixture of fuel/air (without EGR gas) to the pre-chamber port 130. The fuel/air mixture from the intermediate passage 150 is provided to the capillary passage 128 through a second fluid path 152, which optionally includes the pump or valve 172.

The pre-chamber port 130 is also fluidly connectable to the charge passage 162 through a valve 174, which, when open, provides a mixture of fuel/air and EGR gas to the pre-chamber port 130. The mixture of fuel/air/EGR is provided to the pre-chamber port 130 through a first fluid path 175, which extends parallel to and is separate from a portion of the charge passage 162 that supplies an intake charge mixture to the intake valve(s) 116. When considering the operating pressures of various gas mixtures during engine operation, and also a pressure at the pre-chamber port 130 depending on whether the piston is undergoing an intake or compression stroke, a mixture of fuel/air with or without EGR gas can be selectively provided to fill the pre-chamber or, stated differently, to dilute exhaust gas present in the pre-chamber after an expansion stroke, selectively during engine operation by the selective operation of the valve/pump 172 and the valve 174 during engine operation. In other words, the pre-chamber 126 can be selectively purged in stages by fluids provided to the pre-chamber via the first and/or second fluid paths 175 and 152. A controller 176 that communicates with and controls these devices can thus selectively control engine operation, as described below for various embodiments.

More specifically, the controller may command valves 172 and 174 to open and close at different times during one or more engine strokes, which times may be overlapping or separate, to provide different gases into the pre-chamber 126 to displace, dilute, scavenge or otherwise affect the content of different fluids within the pre-chamber 126. In this embodiment, the engine operates using an early intake closing (EIC) Miller cycle, which means that the intake valve(s) corresponding to a cylinder, for example, the intake valve(s) 120 corresponding to the main chamber 104, close early, before the end of an intake stroke or, stated differently, a stroke in which the piston 110 travels from a topmost position (top dead center, or, TDC) in the bore 106 towards a lowermost position (bottom dead center, or, BDC) in the bore 106.

Figure 3:
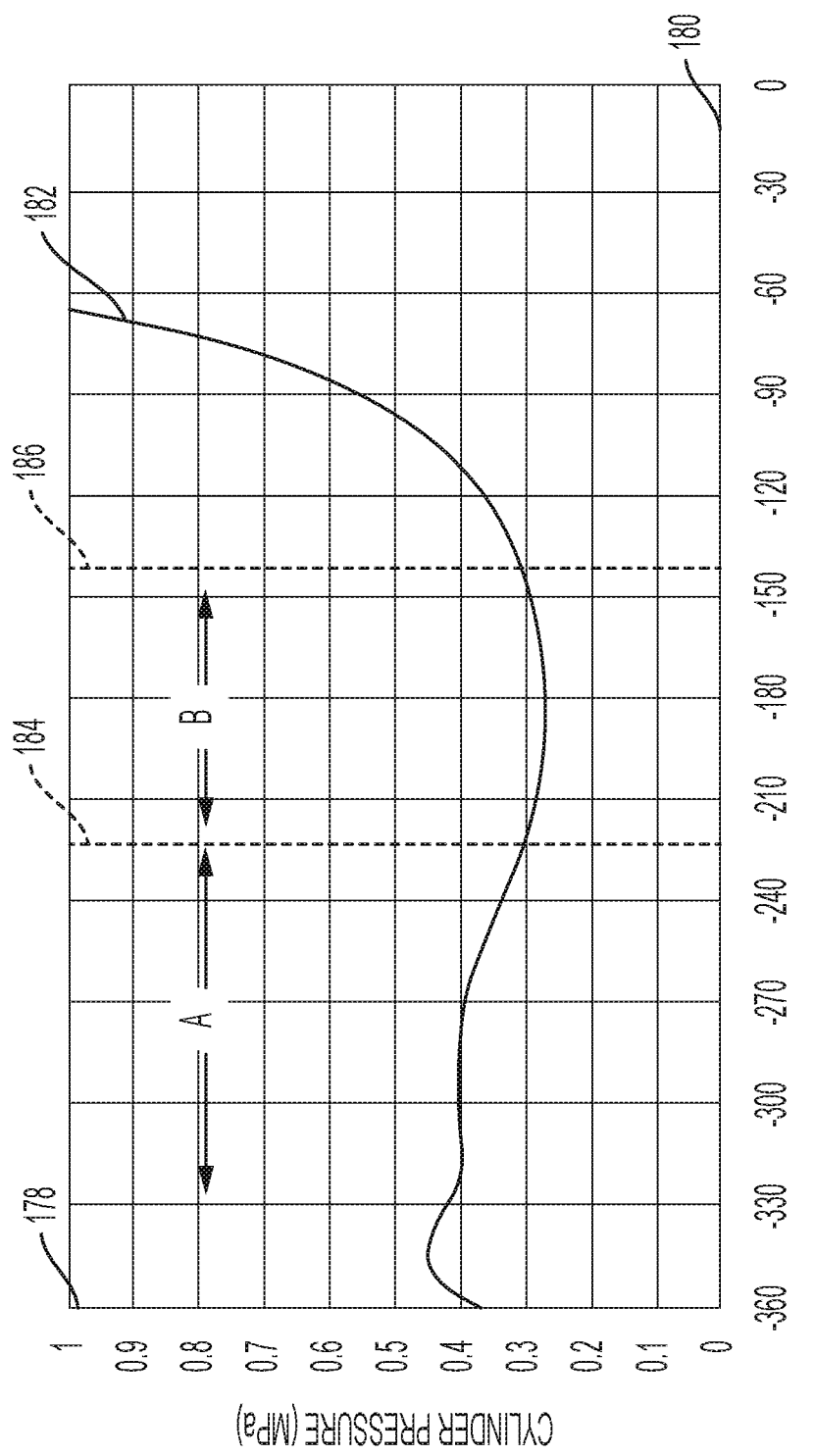
FIG. 3 is a cylinder pressure trace for a cylinder of an engine in accordance with the disclosure.
Figure 4:
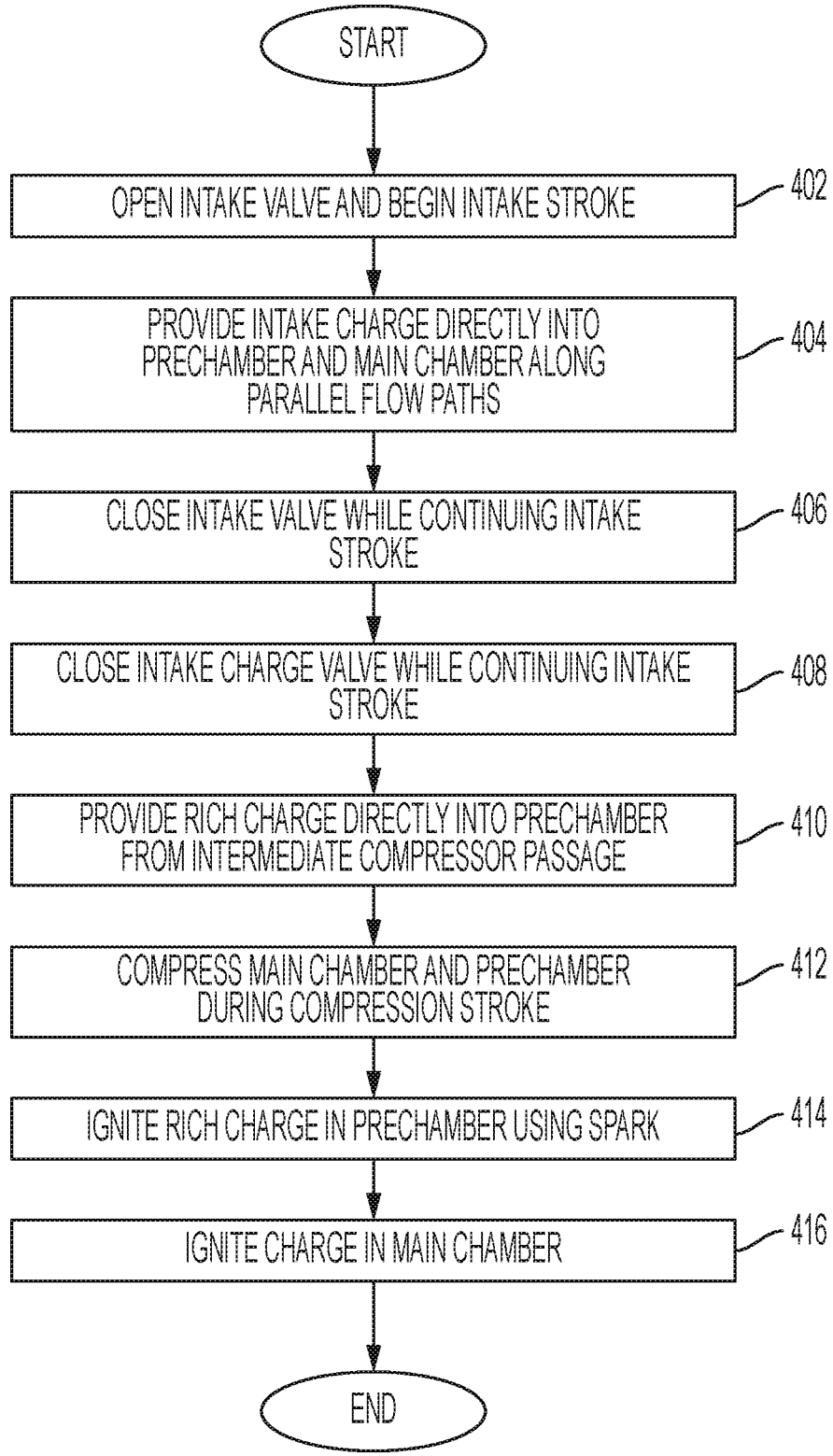
FIG. 4 is a flowchart for a method of purging the pre-chamber of an engine cylinder in accordance with the disclosure.

The chart shown in FIG. 4 illustrates cylinder pressure 182 along a vertical axis 178 representing pressure values and a horizontal axis 180 representing crankshaft angle of rotation during an intake stroke. The pressure 182 remains relatively steady during the intake stroke before a first time 184, at which the intake valve(s) corresponding to the cylinder are still open and a fuel/air and, optionally, EGR gas, are entering the cylinder. While the intake stroke is continuing, the intake valve(s) close at the first time 184 and remain closed up to a second time 186, at which time the piston reverses direction and begins moving from its BDC position back towards the TDC position in a compression stroke. As can be seen from the graph, the cylinder pressure 182 dips during the period between the first and second times 184 and 186 due to the expanding cylinder volume caused by the downward motion of the piston and the closed intake valve(s), which prevent additional material from entering the expanding volume, which for practical purposes is sealed during this period. It can be appreciated that the actual first and second times can differ from what is shown in FIG. 3.

Returning now to the embodiment for the engine 100 shown in FIG. 1, the controller 176 commands the valve 174 to open and the pump or valve 172 to close during an intake stroke and while the intake valve(s) 120 is open during an initial phase of the intake stroke. For example, the initial phase of the intake stroke extends to the left before the first time 184 shown on the chart. During this first phase, which is denoted as "A" in FIG. 3, the pre-chamber 126 receives through the capillary 128 a mixture of fuel, air and EGR gas, which generally has a lower concentration of exhaust gas constituents than the residual exhaust gas that may have been present in the pre-chamber 126 following a previous expansion or power stroke of the main chamber 104. The gas mixture provided to the pre-chamber 126 during the first phase is also the same or similar to the charge mixture that is filling the chamber 104 while the intake valve(s) 120 is open. By providing the gas mixture from the charge passage 162 via the valve 174 directly into the pre-chamber 126, residual exhaust gas present in the pre-chamber 126 is diluted or vented from the pre-chamber 126 into the main chamber 104. At the end of this first phase, fuel, air and EGR gas may be present in the pre-chamber 126 at close to stoichiometric proportions that match the rest of the main chamber 104.

During a second phase, which is denoted as "B" in FIG. 3, which extends between the first and second times 184 and 186, the controller 176 may command the valve 174 to close, thus fluidly isolating the pre-chamber 126 from the charge passage 162, and simultaneously, or concurrently, command the pump/valve 172 to open, such that a mixture from the intermediate passage 150 is provided into the pre-chamber 126 through the capillary 128. During this time, the pressure in the main chamber 104 may be sufficiently low to draw fluids from the intermediate passage 150 directly into the pre-chamber 126, in which case the pump/valve may be embodied simply as a valve. In certain conditions, the pressure in the main chamber 104 may still be higher than the pressure of fluids in the intermediate passage 150, in which case a pump 172 may be required to draw fluid from the intermediate passage 150 and increase its pressure sufficiently so it is pushed into the pre-chamber 126. Whether the device marked as 172 is embodied as a pump or a valve depends on the particular arrangement of the engine and sizing of relevant components. For example, the timing of the EIC Miller, the relative sizing of the HP and LP turbochargers, piping losses in the system, low or high load engine operation and the like may affect the relative pressures between the main chamber 104, the pre-chamber 126, and the intermediate passage 150.

Relevant to the present disclosure, the fluids drawn or pushed into the pre-chamber 126 during the second phase (B, FIG. 3) are fluids having a different composition than the fluids present in the pre-chamber following the first phase in that the intermediate passage 150 includes a fuel/air mixture before EGR gas is introduced. This means that that the fluid mixture provided to the pre-chamber 126 during the second phase will have a higher oxygen concentration than the main chamber 104, which makes for a richer fuel/air mixture that facilitates more reliable ignition under a broader range of engine operating conditions and temperatures. At the end of the intake stroke, the controller commands the pump/valve 172 to close, the engine cylinder 102 undergoes a compression stroke, and ignition ensues in the typical fashion. Depending on the engine operating point, for example, at low loads, wherein the EIC Miller function may be reduced in duration or omitted entirely, the second phase of purging as described above may also be reduced in duration or omitted entirely. Similarly, in conditions having relatively high EGR rates, or at higher engine loads, the second phase purging that injects a richer mixture into the pre-chamber may be extended to overlap the first phase to provide for a more vigorous ignition within the pre-chamber.

Figure 2:
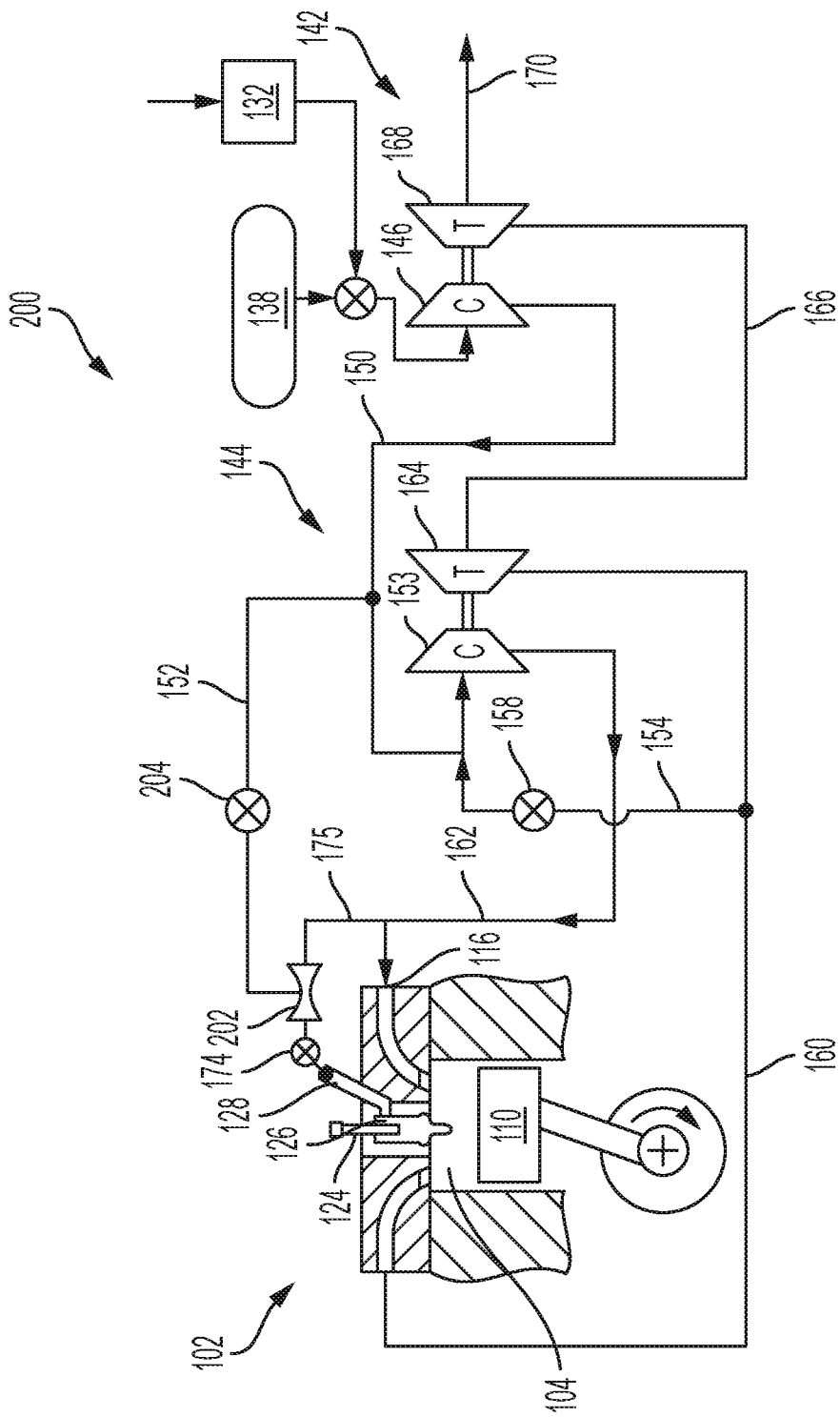
FIG. 2 is a schematic diagram of an alternative embodiment of a portion of an internal combustion engine in accordance with the disclosure.

An alternative embodiment for an engine 200 is shown in FIG. 2, where structures and features that are the same or similar to the engine 100 shown in FIG. 1 are denoted by the same reference numerals as previously used for simplicity. In the engine 200, it can be seen that a device 202 operating with a Venturi effect is connected such that a flow of fluids from the charge passage 162 during at least the first phase of purging described above creates a low pressure region within the device 202 that draws in a flow of fluids from the intermediate passage 150 without the need for a pump, e.g. the pump 172. As shown, the first and second fluid paths 175 and 152 are combined in the device 202 such that the first fluid path 175 extends through a main passage of the device 202 and the second fluid path 152 connects to a narrow throat region of the device 202.

When an optional valve 204 is used, the pre-chamber 126 can operate with fluid from the charge passage 162 during the first phase when the optional valve 204 is closed, and with a mixture of charge from the charge passage 162 and also richer fuel/air mixture from the intermediate passage 150 during the second purge phase, when the optional valve 204 is open. The valve 174 would be open for both phases in this scenario. When the optional valve 204 is omitted, the first and second phases are carried out together while the valve 174 is open such that the mixture of charge fuel air from both the intermediate passage 150 and the charge passage 162 are provided at the same time. In either scenario, the pre-chamber 126 contains a fuel/air mixture having an overall lower EGR gas concentration than the main chamber 104.

Figure 5:
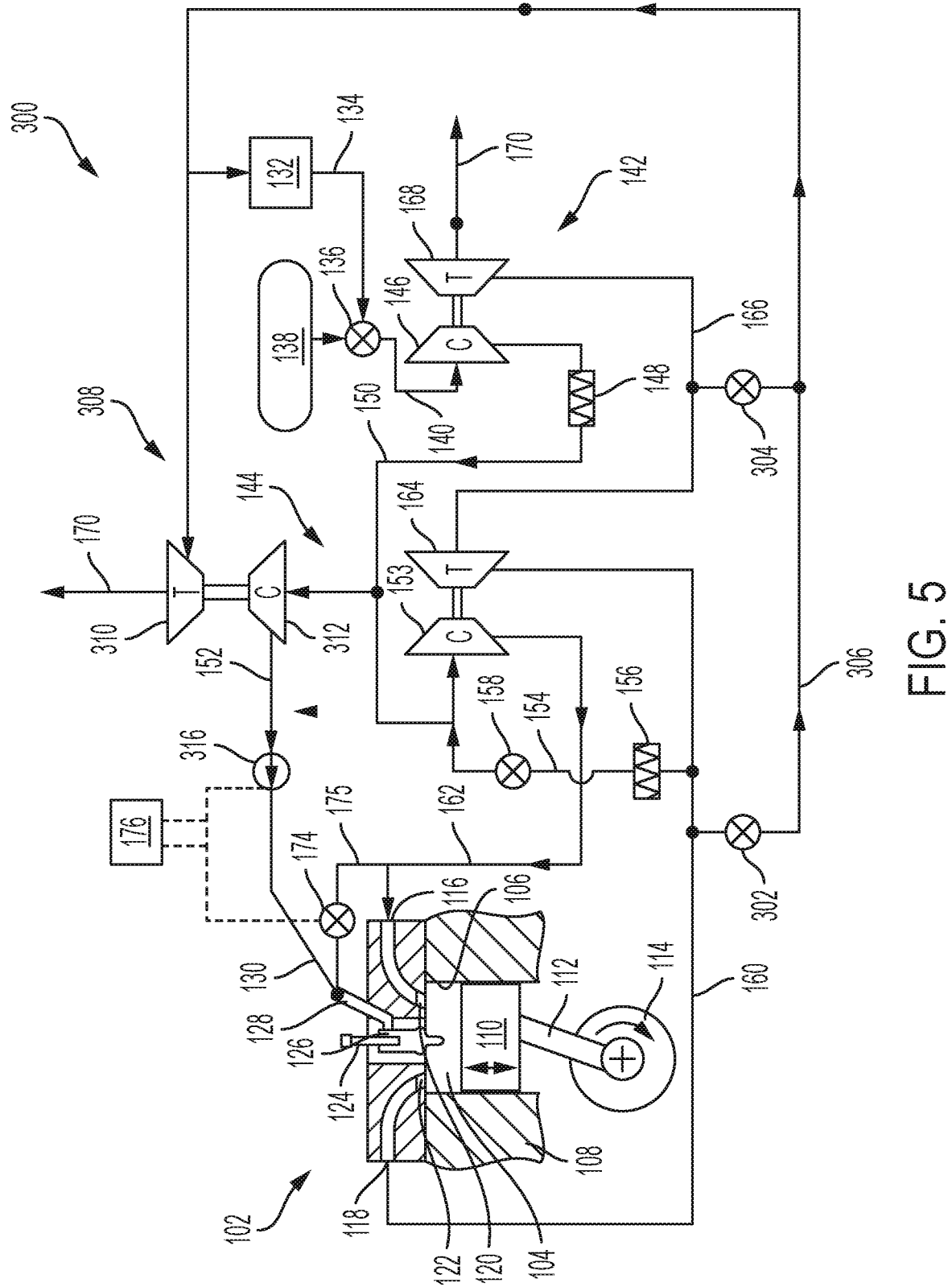
FIG. 5 is a schematic diagram of an alternative embodiment of a portion of an internal combustion engine in accordance with the disclosure.

An alternative embodiment for an engine 300 is shown in FIG. 5, where structures and features that are the same or similar to the engine 100 shown in FIG. 1 are denoted by the same reference numerals as previously used for simplicity. In the engine 300, a third compressor 312 is arranged to draw fluid from the intermediate passage 150 and increase the pressure of at least a portion of that fluid before it is provided to the pre-chamber 126. In this embodiment, it is contemplated that the compressor 312 is one example of a fluid pump that can be used to raise the pressure of the fluid provided to the pre-chamber 126 sufficiently to achieve flow of the fluid into the pre-chamber 126. Other examples of such devices can include mechanical piston or vane pumps that are electrically, pneumatically or hydraulically actuated. In one embodiment, the compressor 312 can be replaced by a supercharger in which case the turbine 310 can be omitted. A valve 316, in conjunction with controller 176, controls the flow through the second fluid passage 152. Exhaust gas from either of the exhaust conduits 160 or 166 drives a turbine 310 associated with and driving the third turbocharger 308. A valve 302 is used to control the flow of exhaust gas from the exhaust conduit 160. Another valve 304 controls the flow of exhaust from the intermediate exhaust conduit 166.

INDUSTRIAL APPLICABILITY

In view of the foregoing, a method for the staged purging of a pre-chamber is shown in FIG. 4. As can be appreciated, the systems and methods described herein make reference to various strokes of engine operation such as intake stroke, compression stroke, power or expansion stroke, and the like. It is contemplated that the systems and methods described herein can be used in any engine having a cylinder with a pre-chamber associated therewith, whether the engine operates on two strokes, four strokes, or multiple strokes.

The method shown in the flowchart of FIG. 4 begins with the initiation of an intake stroke and the opening of one or more intake valves corresponding to the engine cylinder performing the intake stroke at 402. During a first purging stage, intake charge that includes fuel, air and EGR gas is provided directly to the pre-chamber and also the main chamber formed in the engine cylinder at 404. As discussed and shown above, while the pre-chamber and main chamber are fluidly open to one another, the intake charge provided to the pre-chamber is provided through a separate path that runs parallel to a normal intake charge path for material into the engine cylinder. For example, the parallel paths in FIG. 1 extend from the charge passage 162 either through the intake port 116 or through the pre-chamber port 130.

Still during the intake stroke, the intake valve is closed at 406, for example, in accordance with an EIC Miller cycle, and also an intake charge valve supplying intake charge to the pre-chamber is also closed at 408. A rich charge containing fuel and air, which is drawn upstream of a point of introduction of EGR gas in the intake charge, is supplied directly to the pre-chamber at 410. In the example, shown in FIG. 1, EGR is introduced at the inlet of an HP compressor, while the rich charge is drawn from between the HP and LP compressors. The main chamber is compressed at 412, and the rich charge in the pre-chamber is ignited at 414, which also ignites the main chamber at 416.

In the present disclosure, it is contemplated that the main chamber will operate at or close to stoichiometric air to fuel ratios, which are known to mean that the relative quantities of air and fuel are exactly enough to combust all of each component. For example, LNG may have a stoichiometric ratio of, e.g., 17.2:1, while lean conditions may occur at air/fuel ratios of, e.g., 30:1. The stoichiometric mixture will burn faster than lean mixtures resulting in a more energetic and complete combustion and improving the combustion in the main combustion chamber. Similarly, a rich mixture in the pre-chamber will burn more energetically and completely than a stoichiometric mixture present in the main chamber. When EGR is not used in the engine under certain conditions, the pre-chamber mixture will generally match the mixture in the main chamber.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An internal combustion engine, comprising:
   a low pressure (LP) turbocharger having a LP compressor;
   a high pressure (HP) turbocharger having a HP compressor connected in series with the LP compressor along an intermediate passage, and a HP turbine;
   an engine cylinder having an intake valve that fluidly connects a main chamber of the engine cylinder with an outlet of the HP compressor through an intake passage, and an exhaust valve that fluidly connects the main chamber with an inlet of the HP turbine via an exhaust conduit;
   an exhaust gas recirculation (EGR) passage fluidly interconnected between the exhaust conduit and the intake passage;
   a pre-chamber enclosing a spark plug and being fluidly open with the main chamber of the engine cylinder;
   a first fluid path extending from the intake passage directly to the pre-chamber; and
   a second fluid path extending from the intermediate passage directly to the pre-chamber.

2. The internal combustion engine of claim 1, wherein the first fluid path includes a valve.

3. The internal combustion engine of claim 1, wherein the second fluid path includes one of a pump, a compressor or a valve.

4. The internal combustion engine of claim 1, wherein the first and second fluid paths are combined in a device operating under a Venturi effect in which the first fluid path extends through a main passage of the device and the second fluid path connects to a narrow throat region.

5. The internal combustion engine of claim 1, further comprising a controller disposed to selectively control a flow of fluid through the first and second fluid paths, the controller being programmed to:
   provide a flow of an intake charge from the intake passage into the pre-chamber through the first fluid path during an intake stroke of the engine cylinder in which a piston slidably disposed within the engine cylinder moves from at top dead center (TDC) position within the engine cylinder towards a bottom dead center (BDC) position within the engine cylinder and in which the intake valve is open;
   block the flow of the intake charge into the pre-chamber through the first fluid path during the intake stroke at a first time when the intake valve closes and remains closed at least up to a second time; and
   allow a flow of a fuel/air mixture from the intermediate passage into the pre-chamber through the second fluid path in a period between the first and second times.

6. The internal combustion engine of claim 5, further comprising causing a pump to increase a pressure of the flow of fuel/air mixture along the second fluid path.

7. The internal combustion engine of claim 1, further comprising a mixer that provides a fuel and air mixture to an inlet of the LP compressor.

8. A method for purging a pre-chamber that contains a spark plug and is associated with a main combustion chamber of a reciprocal piston internal combustion engine, the method comprising:
   opening an intake valve at a beginning of an intake stroke for an engine cylinder;
   providing an intake charge directly into the pre-chamber and the main combustion chamber along parallel but separate flow paths in a first purge stage, the intake charge containing fuel, air and recirculated exhaust gas;
   closing the intake valve while continuing the intake stroke;
   providing a rich charge directly into the pre-chamber from an intermediate compressor stage in a second purge stage, the rich charge containing fuel and air but not recirculated exhaust gas;
   wherein the intake charge is provided to the pre-chamber along a first fluid path, and wherein the rich charge is provided to the pre-chamber along a second fluid path;
   compressing the main combustion chamber and pre-chamber during a compression stroke;
   igniting the rich charge in the pre-chamber; and
   igniting the intake charge in the main combustion chamber.

9. The method of claim 8, wherein the first purge stage is also carried out during the intake stroke and after the intake valve is closed.

10. The method of claim 8, wherein the second purge stage is also carried out during the intake stroke while the intake valve is open.

11. The method of claim 8, wherein the first and second fluid paths are combined in a device operating under a Venturi effect in which the first fluid path extends through a main passage of the device and the second fluid path connects to a narrow throat region.

12. The method of claim 8, further comprising pumping the rich charge through the second fluid path.

13. The method of claim 8, further comprising creating the rich charge by mixing fuel and air.

* * * * *